United States Patent [19]

Hori

[11] Patent Number: 4,921,229
[45] Date of Patent: May 1, 1990

[54] FLUID-FILLED ELASTIC CENTER BEARING MOUNT

[75] Inventor: Hiroaki Hori, Komaki, Japan

[73] Assignee: Tokai Rubber Industries, Ltd., Aichi, Japan

[21] Appl. No.: 404,846

[22] Filed: Sep. 8, 1989

[30] Foreign Application Priority Data

Sep. 21, 1988 [JP] Japan .............................. 63-123918[U]

[51] Int. Cl.⁵ .............................. F16F 9/10; F16F 1/38
[52] U.S. Cl. .................................... 267/140.1; 384/99; 384/220; 384/536
[58] Field of Search ................ 384/220, 221, 535, 536, 384/581, 582, 99; 267/140.1 R, 140.1 C

[56] References Cited

U.S. PATENT DOCUMENTS 3,697,144 10/1972 Beeskow ............................... 384/220
4,705,410 11/1987 von Broock ........................ 267/140.1
4,722,618 2/1988 Matsumoto ........................... 384/536
4,749,174 6/1988 Kanda ................................ 267/140.1

FOREIGN PATENT DOCUMENTS

54-29402 9/1979 Japan .
59-54316 4/1984 Japan .
61-116250 7/1986 Japan .
46033 2/1989 Japan ................................ 267/140.1

Primary Examiner—Thomas R. Hannon
Attorney, Agent, or Firm—Oliff & Berridge

[57] ABSTRACT

A fluid-filled elastic mount for flexibly supporting a vehicle propeller shaft to the vehicle body, having an elastic body interposed between an inner and an outer sleeve. The mount has a pressure-receiving chamber, and a generally arcuate void which extends axially of the sleeves and which is located opposite to the pressure-receiving chamber in the diametric direction of the sleeves. The mount further has a first and a second equilibrium chamber adjacent to the circumferential ends of the pressure-receiving chamber and are partially defined by a first and a second flexible diaphragm. The pressure-receiving chamber communicates with the first and second equilibrium chambers through differently tuned first and second orifice, respectively. An elastic stop is disposed within the pressure-receiving chamber for limiting the relative displacement of the inner and outer sleeves.

13 Claims, 4 Drawing Sheets

FLUID-FILLED ELASTIC CENTER BEARING MOUNT

BACKGROUND OF THE INVENTION

1. Field of the Invention

The present invention relates to a fluid-filled elastic center bearing mount for flexibly supporting a propeller shaft of a motor vehicle on the vehicle body.

2. Discussion of the Prior Art

As an intermediate bearing for supporting the propeller shaft of a motor vehicle at its longitudinally middle portion on the body of the vehicle, there has been used a so-called center bearing mount. Examples of such a center bearing mount are disclosed in laid-open Publication No. 54-29402 of examined Japanese Utility Model Application, and laid-open Publication No. 59-54316 of unexamined Japanese Utility Model Application. The center bearing mounts disclosed in these publications have a metallic inner sleeve and a metallic outer sleeve which are disposed with a suitable radial spacing therebetween, and an elastic body made of a rubber material interposed between the inner and outer sleeves. The propeller shaft is inserted through the inner sleeve of the mount via a suitable center bearing such as a ball bearing, while the outer sleeve of the mount is secured to the vehicle body, whereby the propeller shaft is flexibly connected to the vehicle body by the center bearing mount.

The center bearing mount is required to attain two different functions, namely, a function of supporting the propeller shaft, and a function of isolating or damping the vibrations of the propeller shaft to be transmitted to the vehicle body. The second function consists principally of two vibration damping or isolating capabilities or characteristics, that is, sufficient capability of damping high-amplitude vibrations having a relatively low frequency of about 5-30 Hz which occur due to secondary couples caused by a joint angle of the propeller shaft upon starting of the vehicle, and a characteristic of exhibiting sufficiently low dynamic spring constant with respect to low-amplitude vibrations having a relatively high frequency of about 50-200 Hz which occur due to a secondary component of a rotary motion of the vehicle engine transmitted to the propeller shaft.

In view of the above requirements, the assignee of the present application developed a fluid-filled elastic center bearing mount in laid-open Publication No. 61-166250 of unexamined Utility Model Application wherein an elastic body partially defining a pair of fluid chambers between the inner and outer sleeves, such that the two fluid chambers are located opposite to each other in a diametric direction of the sleeves in which input vibrations are primarily received by the mount. The fluid chambers are filled with a non-compressible fluid, and are held in communication with each other through a suitable orifice. In this type of fluid-filled elastic center bearing mount, the input vibrations applied to the inner and outer sleeves are damped or isolated based on resonance of the fluid which flows through the orifice due to pressure variations in the fluid chambers caused by a relative displacement of the two sleeves.

However, the range of the frequency of the vibrations that can be effectively damped or isolated based on the fluid mass resonance in the center bearing mount constructed as described above is limited or determined by the specific configuration and dimensions of the orifice. If the orifice is tuned so as to effectively damp low-frequency vibrations, the orifice tends to be placed in a condition as if the orifice was closed, when the input vibrations have a frequency higher than that of the low-frequency vibrations to which the orifice is tuned. Consequently, the center bearing mount exhibits an excessively high dynamic spring constant upon application of the high-frequency vibrations, and suffers from comparatively low vibration isolating capability for the high-frequency vibrations.

Thus, the fluid-filled elastic center bearing mount described above is still unsatisfactory or has some room for improvements, particularly in terms of the frequency range of the vibrations that can be suitably and effectively damped or isolated, for assuring enhanced driving comfort of the vehicle.

SUMMARY OF THE INVENTION

It is therefore an object of the present invention to provide a fluid-filled elastic center bearing mount which is capable of effectively damping or isolating vibrations over a wide frequency range of the vibrations.

The above object may be achieved according to the principle of the present invention, which provides a fluid-filled elastic center bearing mount for flexibly supporting a propeller shaft of a motor vehicle on a body of the vehicle through a center bearing, comprising: an inner sleeve and an outer sleeve disposed radially outwardly of the inner sleeve, the propeller shaft being extending through the inner sleeve, and the outer sleeve being secured to the body; an elastic body interposed between the inner and outer sleeves for elastically connecting the sleeves, and partially defining a pressure-receiving chamber between the inner and outer sleeves, such that the pressure-receiving chamber extends over a predetermined circumferential length of the sleeves, the pressure-receiving chamber being filled with a non-compressible fluid and receiving a vibrational load applied between the sleeves, the elastic body having a generally arcuate void which extends in an axial direction of the inner and outer sleeves and which is located opposite to the pressure-receiving chamber in a diametrical direction of the inner sleeve in which the vibrational load is primarily received by the pressure-receiving chamber; means for defining a first and a second variable-volume equilibrium chamber adjacent to circumferentially opposite ends of the pressure-receiving chamber, the means for defining the equilibrium chambers comprising a first and a second flexible diaphragm; orifice-defining means for defining a first orifice for fluid communication between the pressure-receiving chamber and the first equilibrium chamber, and a second orifice for fluid communication between the pressure-receiving chamber and the second equilibrium chamber; and an elastic stop disposed within the pressure-receiving chamber and extending from one of the inner and outer sleeves toward the other in the diametrical direction.

In the fluid-filled elastic center bearing mount of the present invention constructed as described above, the first and second orifices may be tuned to different ranges of vibrations to be damped or isolated, so that the vibrations having a relatively low frequency may be effectively damped based on resonance of the fluid mass flowing through the first orifice between the pressure-receiving chamber and the first equilibrium chamber, while the center bearing mount exhibits a sufficiently low dynamic spring constant based on resonance of the fluid mass flowing through the second orifice between the pressure-receiving chamber and the second equilibrium chamber, when the vibrations having a relatively high frequency are applied to the mount. Thus, the present center bearing mount exhibits not only a high vibration-damping effect when the frequency of the input vibrations is relatively low, and but also a high vibration-isolating effect when the frequency of the input vibrations is relatively high.

Further, the generally arcuate void formed in a portion of the elastic body diametrically opposite to the pressure-receiving chamber permits the elastic body to be easily elastically deformed, causing a variation in the pressure in the pressure-receiving chamber, upon application of the vibrational load, whereby the fluid tends to easily flow through the first and second orifices between the pressure-receiving chamber and the first and second equilibrium chambers. Accordingly, the arcuate void contributes to improved vibration damping and isolating characteristics of the mount.

In addition, the elastic stop disposed within the pressure-receiving chamber functions to limit the amount of relative displacement of the inner and outer sleeves and the amount of elastic deformation of the elastic body, even if an excessively large vibration load is applied to the mount. Thus, the elastic stop is effective to increase the durability of the elastic body.

The first and second flexible diaphragms may define bottoms of the first and second equilibrium chambers and serve as partition walls between the generally arcuate void and the equilibrium chambers. In this case, the first and second flexible diaphragms are formed as part of the elastic body. The elastic stop may be formed as an integral part of the elastic body.

The fluid-filled elastic center bearing mount may further comprise another elastic stop disposed within the generally arcuate void.

The first flexible diaphragm may consist of thin walls defining opposite ends of the first equilibrium chamber which are opposite to each other in the axial direction of the inner and outer sleeves. The second flexible diaphragm may also consist of thin walls defining opposite ends of the second equilibrium chamber which are opposite to each other in the axial direction. In this case, the mount may further comprise a second elastic stop disposed within the generally arcuate void, in addition to the elastic stop disposed within the pressure-receiving chamber. The mount may further comprise a pair of third elastic stop disposed within the first and second equilibrium chambers.

The orifice-defining means may comprise at least one orifice-defining member which is interposed between the elastic body and the outer sleeve and which has a first and a second groove. These grooves are formed in an outer circumferential surface of the orifice-defining member or members and are closed by the outer sleeve. The first and second groove define a part of the first and second orifices, respectively. In this case, the first groove may be longer than the second groove, so that the vibrations having a relatively low frequency may be suitably damped based on the resonance of the fluid mass flowing through the first orifice, while the vibrations having a relatively high frequency may be isolated based on the resonance of the fluid mass flowing through the second orifice.

The orifice-defining means may comprise an orifice-defining member interposed between the inner sleeve and the elastic body. The orifice-defining member has a groove formed in an inner circumferential surface thereof and closed by the inner sleeve, so as to define a part of the first orifice. In this case, the orifice-defining means may further comprise a metallic sleeve mounted on an outer circumferential surface of the elastic body. The metallic sleeve has a groove formed in an outer circumferential surface thereof and closed by the outer sleeve, so as to define a part of the second orifice. The groove formed in the orifice-defining member may be longer than the groove of the metallic sleeve.

BRIEF DESCRIPTION OF THE DRAWINGS

The above and optional objects, features and advantages of the present invention will be better understood by reading the following detailed description of presently preferred embodiments of the present invention, when considered in connection with the accompanying drawings, in which.

DETAILED DESCRIPTION OF THE PREFERRED EMBODIMENTS

Referring first to FIGS. 1-4, reference numeral 10 generally designates a fluid-filled elastic center bearing mount which has an inner sleeve 12 and an outer sleeve 14, each made of a metallic material. The outer sleeve 14 is disposed radially outwardly of the inner sleeve 12, such that the two sleeves 12, 14 are coaxial with each other, with a suitable radial distance therebetween. Between the inner and outer sleeves 12, 14, there is formed a generally cylindrical elastic body 16 for elastically and integrally connecting the two sleeves.

The center bearing mount 10 is used for flexibly supporting a propeller shaft of a motor vehicle to the body of the vehicle, such that the propeller shaft extends through a bore 18 of the inner sleeve 12, with a center bearing interposed between the propeller shaft and the inner sleeve 12, while the outer sleeve 14 is secured to the vehicle body. The center bearing mount 10 is installed between the vehicle body and the propeller shaft, in the same vertical orientation as shown in FIG. 1, so that a vibrational load is applied to the mount 10 primarily in the vertical direction of FIG. 1, i.e., the mount 10 receives primarily vibrations in the vertical direction of the vehicle.

Figure 5:
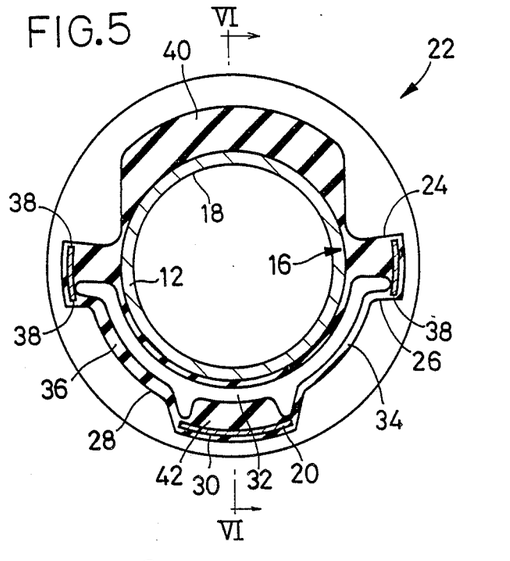
FIG. 5 is an elevational view in transverse cross section of an inner assembly of the mount prepared by vulcanization during manufacture of the mount.
Figure 6:
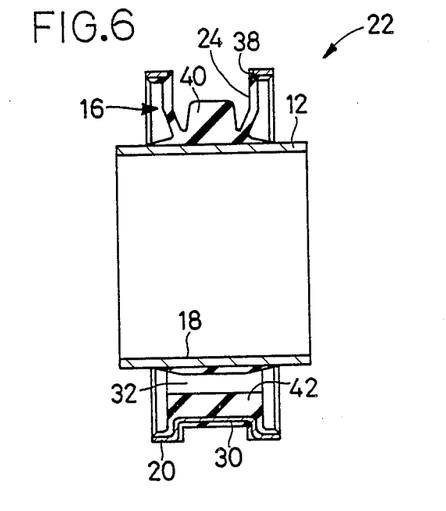
FIG. 6 is a cross sectional view taken along line V—V of FIG. 5.

The elastic body 16 is bonded by means of vulcanization to the outer circumferential surface of the inner sleeve 12, and a thin-walled metallic sleeve 20 is bonded by vulcanization to the outer circumferential surface of the elastic body 16. These inner sleeve 12, elastic body 16 and metallic sleeve 20 constitute an inner assembly 22 of the mount 10, as illustrated in FIGS. 5 and 6. That is the inner assembly 22 is an intermediate product prepared during manufacture of the mount, wherein the inner and metallic sleeves 12, 20 are secured to the inner and outer circumferential surfaces of the elastic body 16, by vulcanization of an unvulcanized material into the elastic body 16 within a suitable mold.

Figure 1:
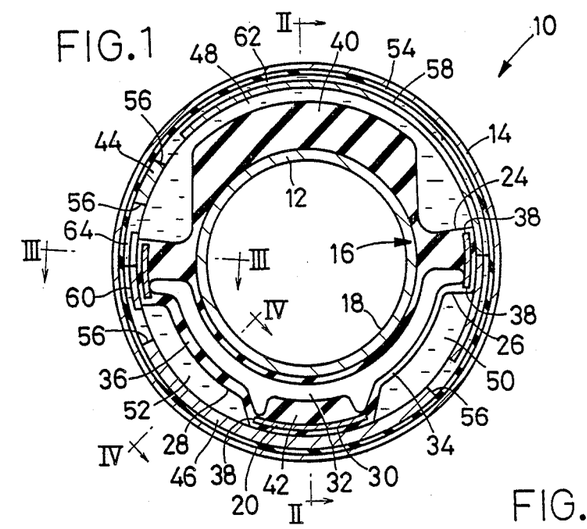
FIG. 1 is an elevational view in transverse cross section of a fluid-filled elastic center bearing mount of the present invention.
Figure 2:
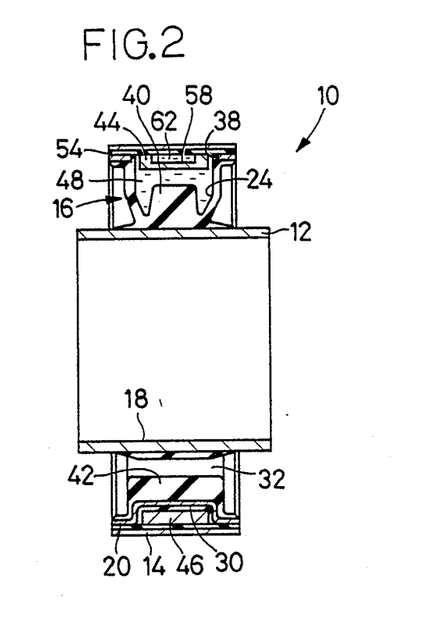
FIG. 2 is an elevational cross sectional view taken along line II—II of FIG. 1.
Figure 3:
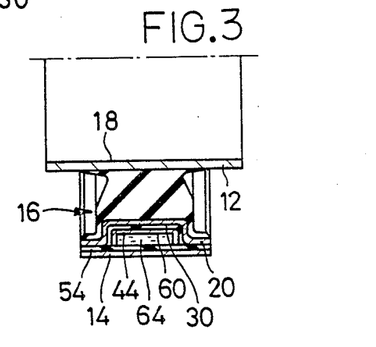
FIG. 3 is a fragmentary cross sectional view of the mount taken along line III—III of FIG. 1.
Figure 4:
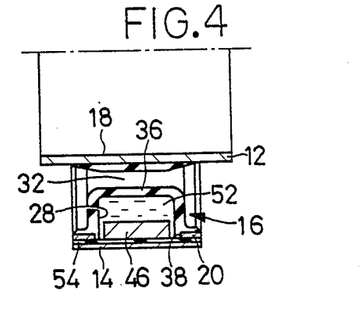
FIG. 4 is a fragmentary cross sectional view taken along line IV—IV of FIG. 1.

The metallic sleeve 20 of the inner assembly 22 has a circumferential recess 30 in an axially intermediate portion thereof, as indicated in FIG. 2. In other words, the axially intermediate portion of the metallic sleeve 20 has a reduced diameter so as to form the circumferential recess 30. The axially intermediate portion of the metallic sleeve 20 has three windows 38 which are spaced from each other in the circumferential direction, such that the windows 38 are aligned with respective first, second and third pockets 24, 26 and 28 which are formed in an axially intermediate portion of the generally cylindrical elastic body 16. The first pocket 24 extends over substantially a half of its outer circumference. The second and third pockets 26, 28 are positioned adjacent to the opposite ends of the first pocket 24, in the circumferential direction of the elastic body 16, i.e., in the circumferential direction of the inner and outer sleeves 12, 14, as shown in FIG. 1. Each of the second and third pockets 26, 28 has a circumferential length corresponding to about one-fourth of the circumference of the elastic body 16 (inner and outer sleeves 12, 14). The pockets 24, 26, 28 are open through the respective windows 38 of the metallic sleeve 20.

As most clearly shown in FIG. 1, the elastic body 16 has a generally arcuate void 32 formed in a relatively radially inner portion thereof, so as to extend in the axial direction of the mount 10. The arcuate void 32 has a circumferential length equal to about a half of the circumference of the elastic body 16, and is located opposite to the first pocket 24 in the diametric direction of the inner sleeve 12 in which the mount 10 primarily receives a vibrational load. This arcuate void 32 contributes to giving the elastic body 16 with a comparatively soft spring characteristic with respect to the vibrations applied in the vertical direction (as seen in FIG. 5) of the vehicle, in particular. The second and third pockets 24, 26 are partially defined by a first and a second thin-walled bottom wall 34, 36, respectively. These bottom walls 34, 36 of the second and third pockets 24, 26 also partially define the above-indicated arcuate void 32, and serve as flexible diaphragms which are elastically yieldable or deformable. These flexible diaphragms 34, 36 function as partition walls between the arcuate void 32 and the pockets 26, 28. As seen in FIG. 1, the first bottom wall 34 of the second pocket 26 has a smaller thickness than the second bottom wall 36 of the third pocket 28, and is accordingly more flexible or elastically deformable than the second bottom wall 36.

The elastic body 16 of the inner assembly 22 is formed with an integral first stop portion 40 which is positioned within the first pocket 24 and extends radially outwardly from the outer circumferential surface of the inner sleeve 12. The elastic body 16 further has a second stop portion 42 which extends radially inwardly from the inner circumferential surface of the metallic sleeve 20, toward the inner sleeve 12. The second stop portion 42 is located opposite to the first stop portion 40 in the diametric direction of the inner sleeve 12. Namely, the second stop portion 42 is positioned between the second and third pockets 26, 28, and partially defines the arcuate void 32.

The inner assembly 22 of FIGS. 5 and 6 thus constructed as an intermediate product of the center bearing mount 10 is radially inwardly compressed on the metallic sleeve 20, as needed. Then, a pair of metallic semicylindrical orifice-defining members 44, 46 are fitted in the circumferential recess 30 of the metallic sleeve 20, and the outer sleeve 14 is subsequently mounted on the inner assembly 22 with the members 44, 46. The two orifice-defining members 44, 46 cooperate with each other to form a cylindrical member.

With the orifice-defining members 44, 46 and outer sleeve 14 mounted on the inner assembly 22, the first, second and third pockets 24, 26, 28 of the elastic body 16 are fluid-tightly closed. As a result, a primary fluid chamber 48 is provided by the first pocket 24, while a first and a second secondary fluid chamber 50, 52 are provided by the second and third pockets 26, 28, respectively. The inner circumferential surface of the outer sleeve 14 is substantially entirely covered by a sealing rubber layer 54. With the rubber layer 54 sandwiched between the outer sleeve 14 and the metallic sleeve and orifice-defining members 20, 44, 46, the fluid chambers 48, 50, 52 are fluid-tightly sealed.

The primary and secondary fluid chambers 48, 50, 52 are filled with a suitable non-compressible fluid such as water, alkylene glycol, polyalkylene glycol and silicone oil. The filling of the chambers 48, 50, 52 can be effected by mounting the orifice-defining members 44, 46 and outer sleeve 14 on the inner assembly 22, within a mass of the selected non-compressible fluid.

The primary chamber 48 serves as a pressure-receiving chamber whose fluid pressure varies when the inner and outer sleeves 12, 14 are displaced relative to each other due to a vibrational load applied between the two sleeves. On the other hand, the secondary fluid chambers 50, 52 serve as a first and a second variable-volume equilibrium chamber whose volumes are changed due to elastic deformation or displacement of the bottom walls or flexible diaphragms 34, 36, thereby preventing a pressure variation in the equilibrium chambers.

The orifice-defining members 44, 46 have a first and a second circumferential groove 58, 60 formed in the outer circumferential surfaces, and four communication holes 56 formed therethrough in the radial direction. With the orifice-defining members 44, 46 mounted on the inner assembly 22, the two holes 56 communicate with the first pocket 24, while the other two holes 56 communicate with the second and third pockets 24, 26, respectively. The first pocket 24 is held in communication with the second pocket 26 through the first circumferential groove 58 and the appropriate communication holes 56, and with the second pocket 28 through the second circumferential groove 60 and the appropriate communication holes 56.

When the outer sleeve 14 with the sealing rubber layer 54 is mounted on the inner assembly 22 with the orifice-defining members 44, 46, the circumferential grooves 58, 60 are fluid-tightly closed by the sealing rubber layer 54, whereby a first and a second orifice 62, 64 are formed. The pressure-receiving chamber 48 communicates with the first equilibrium chamber 50 through the first orifice 58, and with the second equilibrium chamber 52 through the second orifice 60.

When a vibrational load is applied to the thus constructed fluid-filled elastic center bearing mount 10, the inner and outer sleeves 12, 14 are displaced relative to each other, whereby the fluid pressure in the pressure-receiving chamber 48 is changed. Consequently, the non-compressible fluid flows between the pressure-receiving chamber 48, and the first and second variable-volume equilibrium chambers 50, 52, through the first and second orifices 62, 64. As a result, the input vibrations having different frequency ranges can be suitably isolated or damped based on resonance of the fluid masses in the first and second orifices 62, 64. The frequency ranges of the vibrations that can be isolated or damped are determined by suitably tuning the first and second orifices 62, 64.

Described more specifically, the first orifice 62 for fluid communication between the pressure-receiving chamber 48 and the first equilibrium chamber 50 has a relatively large length corresponding to about a half of the entire circumference of the mount 10, and is tuned or dimensioned so that the fluid mass in the orifice 62 undergoes resonance when the mount 10 is subject to input vibrations having a relatively low frequency (5–30 Hz). On the other hand, the second orifice 64 for fluid communication between the pressure-receiving chamber 48 and the second equilibrium chamber 52 has a relatively small length corresponding to about one-eighth of the entire circumference of the mount 10, and is tuned so that the fluid mass in the orifice 64 undergoes resonance when the frequency of the input vibrations is relatively high (50–200 Hz).

Thus, the present center bearing mount 10 exhibits a high damping effect based on the resonance of the fluid mass in the first orifice 62, with respect to low-frequency vibrations which occur due to secondary couples caused by a joint angle of the propeller shaft upon starting of the vehicle. Accordingly, the vibrations within the driver's and passengers' compartments of the vehicle due to such low-frequency vibrations can be effectively reduced. Further, the present mount 10 exhibits a sufficiently low dynamic spring constant based on the resonance of the fluid mass in the second orifice 64, with respect to high-frequency vibrations which occur due to a secondary component of the rotary motion of the engine transmitted through the propeller shaft during running of the vehicle. Therefore, the amount of such high-frequency vibrations that is transmitted to the driver's and passengers' compartments, and the resulting noises can be effectively reduced.

It is noted that the first orifice 62 is longer than the second orifice 64 and accordingly has a larger resistance to a flow of the fluid therethrough than the second orifice 64. Therefore, if the other conditions associated with the first and second orifices 62, 64 were the same, the flow of the flow of the fluid through the first orifice 64 upon application of the low-frequency vibrations would be disturbed by the second orifice 64. In the present embodiment, however, the first bottom wall or flexible diaphragm 34 which partially defines the first equilibrium chamber 50 communication with the pressure-receiving chamber 48 through the first orifice 62 has a smaller thickness and is more elastically yieldable, than the second bottom wall or flexible diaphragm 36 which partially defines the second equilibrium chamber 52 communicating with the pressure-receiving chamber 48 through the second orifice 64. Accordingly, the volume of the first equilibrium chamber 50 is more easily variable than that of the second equilibrium chamber 52, and the fluid may flow through the first orifice 64 in a sufficient degree, when the low-frequency vibrations are applied to the mount 10.

When the high-frequency vibrations are applied to the mount 10, the first orifice 62 acts as if it was closed, and therefore the flow of the fluid through the second orifice 64 will not be disturbed by the first orifice 62.

Further, the instant center bearing mount 10 exhibits a sufficient soft spring characteristic due to a comparatively easy change in the fluid pressure, owing to provision of the generally arcuate void 32, which is formed through the elastic body 16, opposite to the pressure-receiving chamber 48 in the diametric direction of the mount 10 in which the vibrations are applied. This assures sufficient amounts of the fluid flow through the first and second orifices 62, 64, and improve vibration isolating capability of the mount 10 based on the resonance of the fluid masses in the orifices 62, 64.

In the present fluid-filled elastic center bearing mount 10, the relative displacement between the inner and outer sleeves 12, 14 in the vibration input direction is limited by the first stop portion 40 of the elastic body 16 which is abuttable against the inner surface of the orifice-defining member 44, and by the second stop portion 42 which is abuttable against the inner sleeve 12 (via the radially inner portion of the elastic body 16 which partially defines the arcuate void 32). Consequently, the displacement of the propeller shaft relative to the vehicle body can be accordingly limited by stop portions 40, 42, and the elastic body 16 is protected from excessive amount of deformation upon exposure to an excessively large vibrational load. Thus, the elastic body 16 has improved durability.

Figure 7:
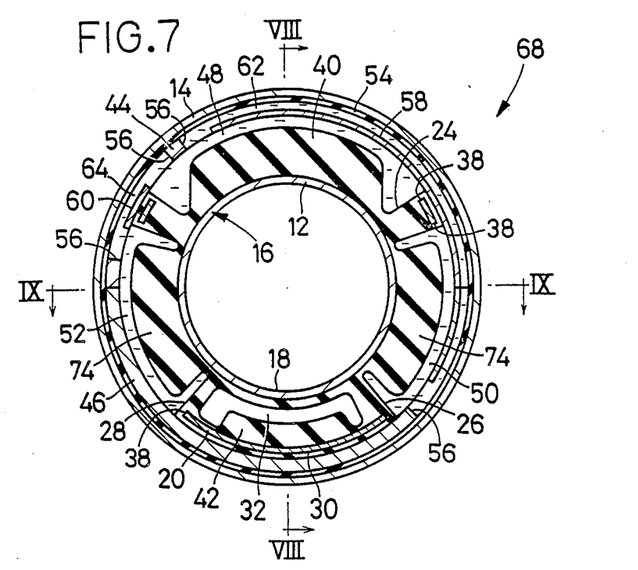
FIG. 7 is a transverse cross sectional view corresponding to that of FIG. 1, showing another embodiment of the invention.
Figure 8:
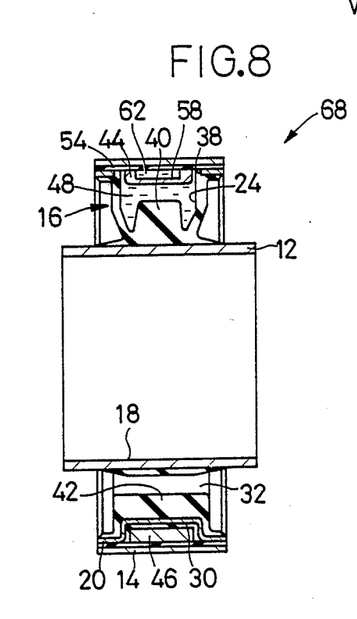
FIG. 8 is a cross sectional view taken along line VIII—VIII of FIG. 7.
Figure 9:
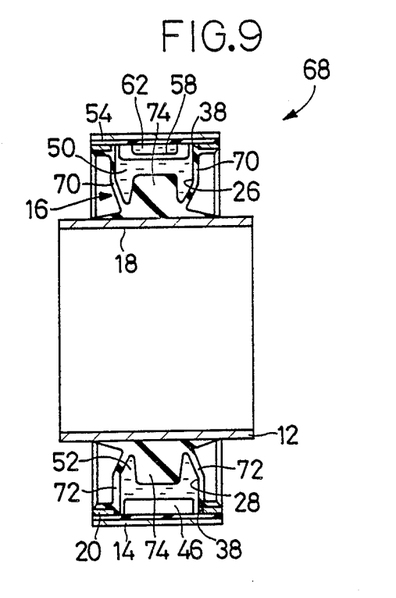
FIG. 9 is a cross sectional view taken along line IX—IX of FIG. 7.

Referring to FIGS. 7–9, there is shown a fluid-filled elastic center bearing mount 68 constructed according to another embodiment of this invention. In the interest of brevity and simplification, the components of the present embodiment similar to those of the preceding embodiment will not be described, with the same reference numerals used to identify the corresponding components.

In the modified embodiment of FIGS. 7–9, the first and second variable-volume equilibrium chambers 50, 52 use flexible diaphragms in the form of thin-walled axial end walls 70, 72 as shown in FIG. 9. These end walls 70, 72 are easily elastically yieldable or deformable so as to permit a variation in the volume of the chambers 50, 52. The thickness of the axial end walls 70 of the first equilibrium chamber 50 is made smaller than that of the axial end walls 72 of the second equilibrium chamber 52, so as to assure a sufficient amount of flow of the fluid through the first orifice 62 upon application of the low-frequency vibrations.

Since the flexible diaphragms for the equilibrium chambers 50, 52 are provided by the end walls 70, 72, the elastic body 16 can be formed with a pair of third stop portions 74 which extend radially outwardly from the inner sleeve 12 into the respective equilibrium chambers 50, 52.

The center bearing mount 68 of the present embodiment also exhibits excellent damping and isolating characteristics for the input vibrations over a wide frequency range, that is, provides a high damping effect for the low-frequency vibrations, based on the resonance of the fluid mass in the first orifice 62, and a sufficiently low dynamic spring constant for the high-frequency vibrations, based on the resonance of the fluid mass in the second orifice 64.

The present mount 68 has an additional advantage owing to the provision of the third stop portions 74 disposed within the first and second equilibrium chambers 50, 52, in addition to the first and second stop portions 40, 42. The third stop portions 74 limit the relative displacements of the inner and outer sleeves 12, 14, in the radial directions (left and right directions) other than the vertical direction of the vehicle (in which the input vibrations are primarily received by the mount 68.

Figure 10:
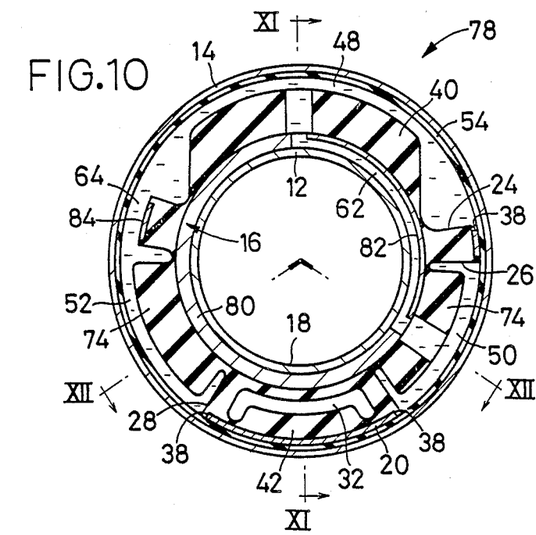
FIG. 10 is a transverse cross sectional view corresponding to that of FIG. 1, showing a further embodiment of the invention.
Figure 11:
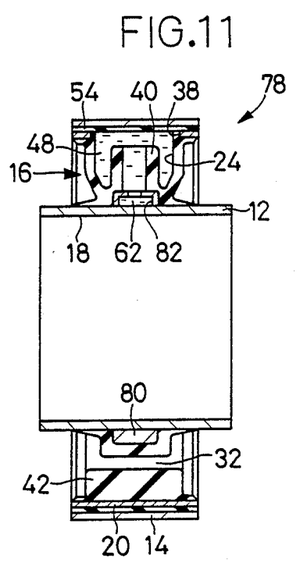
FIG. 11 is a cross sectional view taken along line XI—XI of FIG. 10.
Figure 12:
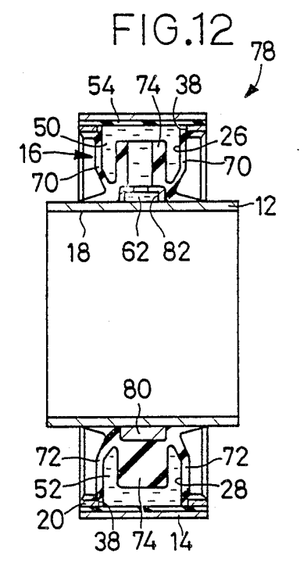
FIG. 12 is a cross sectional view taken along line XII—XII of FIG. 10.

Reference is now made to FIGS. 10-12, which show a further modified embodiment of the present invention, in the form of a center bearing mount 78. In FIGS. 10-12, the same reference numerals as used in FIGS. 7-9 of the second embodiment will be used to identify the corresponding components.

In the center bearing mount 78, a metallic annular orifice-defining member 80 is interposed between the inner sleeve 12 and the elastic body 16. The orifice-defining member 80 has a circumferential groove 82 formed in its inner circumferential surface. The first orifice 62 for fluid communication between the pressure-receiving chamber 48 and the first equilibrium chamber 50 is provided by the groove 82 closed by the outer circumferential surface of the inner sleeve 12.

On the other hand, the second orifice 64 is provided by a circumferential groove 84 formed in an axially intermediate portion of the metallic sleeve 20 fitted on the outer circumference of the elastic body 16. The groove 84 extends between the windows 38 of the sleeve 20 which communicate with the first and third pockets 24, 28 of the elastic body 16. With the groove 84 closed by the rubber layer 54 of the outer sleeve 14, the second orifice 62 is defined, so as to effect fluid communication between the pressure-receiving chamber 48 and the second equilibrium chamber 52.

The center bearing mount 78 according to the third embodiment of FIGS. 10-12 has the same advantages as the second embodiment of FIGS. 7-9.

While the present invention has been described in its presently preferred embodiments with a certain degree of particularity, it is to be understood that the invention is not limited to the details of the illustrated embodiments, but may be embodied with various changes, modifications and improvements, which may occur to those skilled in the art.

For instance, the center bearing mounts 10, 68, 78 may be installed in the posture vertically reversed to that of FIGS. 1, 7 and 10, namely, such that the pressure-receiving chamber 48 is located at the lowermost circumferential position of the mount. In this case, too, the same advantages as described above may be offered by the mounts.

Further, the pressure-receiving chamber 48 may communicate with the first and second equilibrium chambers 50, 52 through respective first and second orifices different from those provided in the illustrated embodiments. The orifices may be designed depending upon the desired vibrations damping and isolating characteristics. For example, the orifice may be defined by a spiral groove formed in the outer or inner circumferential surface of the inner or outer sleeve 12, 14, which consists of one or more turns around the sleeve.

In the illustrated embodiments, the chambers 48, 50, 52 are filled with the non-compressible fluid while the orifice-defining members 44, 46 and outer sleeve 14 are mounted on the prepared inner assembly 22, within a mass of the fluid. However, the chambers may be filled otherwise, for example, by injecting the fluid into the chambers through suitable filler holes formed through the outer sleeve 14. In this instance, the filler holes are closed by suitable plugs such as rivets.

It will be understood that the invention may be embodied with various other changes, modifications and improvements, which may occur to those skilled in the art, without departing from the spirit and scope of the invention defined in the following claims.

What is claimed is:

1. A fluid-filled elastic center bearing mount for flexibly supporting a propeller shaft of a motor vehicle on a body of the vehicle through a center bearing, comprising:

an inner sleeve and an outer sleeve disposed radially outwardly of said inner sleeve, said propeller shaft being extending through said inner sleeve, and said outer sleeve being secured to said body;

an elastic body interposed between said inner and outer sleeves for elastically connecting the sleeves;

said elastic body partially defining a pressure-receiving chamber between said inner and outer sleeves, such that said pressure-receiving chamber extends over a predetermined circumferential length of said sleeves, said pressure-receiving chamber being filled with a non-compressible fluid and receiving a vibrational load applied between said sleeves;

said elastic body having a generally arcuate void which extends in an axial direction of the inner and outer sleeves and which is located opposite to said pressure-receiving chamber in a diametrical direction of said inner sleeve in which said vibrational load is primarily received by said pressure-receiving chamber;

means for defining a first and a second variable-volume equilibrium chamber adjacent to circumferentially opposite ends of said pressure-receiving chamber, said means for defining the equilibrium chambers comprising a first and a second flexible diaphragm;

orifice-defining means for defining a first orifice for fluid communication between said pressure-receiving chamber and said first equilibrium chamber, and a second orifice for fluid communication between said pressure-receiving chamber and said second equilibrium chamber; and an elastic stop disposed within said pressure-receiving chamber and extending from one of said inner and outer sleeves toward the other in said diametrical direction.

2. A fluid-filled elastic center bearing mount according to claim 1, wherein said first and second flexible diaphragms define bottoms of said first and second equilibrium chambers and serve as partition walls between said generally arcuate void and the equilibrium chambers.

3. A fluid-filled elastic center bearing mount according to claim 1, wherein said elastic stop consists of a part of said elastic body.

4. A fluid-filled elastic center bearing mount according to claim 1, further comprising another elastic stop disposed within said generally arcuate void.

5. A fluid-filled elastic center bearing mount according to claim 1, wherein said first flexible diaphragm consists of thin walls defining opposite ends of said first equilibrium chamber which are opposite to each other in said axial direction of the inner and outer sleeves, and said second flexible diaphragm consists of thin walls defining opposite ends of said second equilibrium chamber which are opposite to each other in said axial direction.

6. A fluid-filled elastic center bearing mount according to claim 5, further comprising a second elastic stop disposed within said generally arcuate void, in addition to said elastic stop disposed within said pressure-receiving chamber.

7. A fluid-filled elastic center bearing mount according to claim 6, further comprising a pair of third elastic stop disposed within said first and second equilibrium chambers.

8. A fluid-filled elastic center bearing mount according to claim 1, wherein said orifice-defining means comprises at least one orifice-defining member interposed between said elastic body and said outer sleeve, said at least one orifice-defining member having a first and a second groove which are formed in an outer circumferential surface thereof and which are closed by said outer sleeve, said first and second groove defining a part of said first and second orifices, respectively.

9. A fluid-filled elastic center bearing mount according to claim 8, wherein said first groove is longer than said second groove.

10. A fluid-filled elastic center bearing mount according to claim 1, wherein said orifice-defining means comprises an orifice-defining member interposed between said inner sleeve and said elastic body, said orifice-defining member having a groove formed in an inner circumferential surface thereof and closed by said inner sleeve, said groove defining a part of said first orifice.

11. A fluid-filled elastic center bearing mount according to claim 10, wherein said orifice-defining means further comprises a metallic sleeve mounted on an outer circumferential surface of said elastic body, said metallic sleeve having a groove formed in an outer circumferential surface thereof and closed by said outer sleeve, said groove of said metallic sleeve defining a part of said second orifice.

12. A fluid-filled elastic center bearing mount according to claim 11, wherein said groove of said orifice-defining member is longer than said groove of said metallic sleeve.

13. A fluid-filled elastic center bearing mount according to claim 1, wherein said first flexible diaphragm has a smaller thickness than said second flexible diaphragm.

* * * * *